(12) United States Patent
Yoda et al.

(10) Patent No.: US 6,977,453 B2
(45) Date of Patent: Dec. 20, 2005

(54) ELECTRIC ROTATING MACHINE PROVIDED WITH A FIELD CONTROL COIL

(75) Inventors: Takeshi Yoda, Gunma (JP); Yumiko Kimura, Gunma (JP); Hidekazu Uchiyama, Gunma (JP)

(73) Assignee: Mitsuba Corporation, Gunma (JP)

( * ) Notice: Subject to any disclaimer, the term of this patent is extended or adjusted under 35 U.S.C. 154(b) by 80 days.

(21) Appl. No.: 10/472,547

(22) PCT Filed: Mar. 28, 2002

(86) PCT No.: PCT/JP02/03030
§ 371 (c)(1),
(2), (4) Date: Sep. 23, 2003

(87) PCT Pub. No.: WO02/080338
PCT Pub. Date: Oct. 10, 2002

(65) Prior Publication Data
US 2004/0113507 A1 Jun. 17, 2004

(30) Foreign Application Priority Data
Mar. 28, 2001 (JP) ........................................ 2001-092765

(51) Int. Cl.$^7$ ........................... H02K 21/22; F02N 11/04
(52) U.S. Cl. ............. 310/156.46; 310/190; 310/156.49; 310/156.26
(58) Field of Search ................................. 310/190, 156

(56) References Cited

U.S. PATENT DOCUMENTS

| | | | |
|---|---|---|---|
| 3,411,027 A | * 11/1968 | Rosenberg | .................. 310/181 |
| 4,754,154 A | * 6/1988 | Motodate | ..................... 290/46 |
| 5,767,601 A | 6/1998 | Uchiyama | |
| 6,700,279 B1 | * 3/2004 | Uchiyama et al. | .......... 310/190 |
| 6,727,632 B2 | * 4/2004 | Kusase | ....................... 310/266 |

FOREIGN PATENT DOCUMENTS

| | | | | |
|---|---|---|---|---|
| EP | 1046812 | * 10/2000 | ........... | F02N/11/04 |
| FR | 2663797 | * 12/1991 | ............ | H02K/1/27 |
| JP | 36-28311 | 10/1961 | | |
| JP | 7-59314 | 3/1995 | | |
| JP | 7-59319 | * 3/1995 | .......... | H02K/21/28 |
| JP | 9-170532 | * 6/1997 | ........... | F02N/11/00 |
| JP | 2000-156962 | 6/2000 | | |

* cited by examiner

*Primary Examiner*—Burton Mullins
(74) *Attorney, Agent, or Firm*—Eitan, Pearl, Latzer & Cohen Zedek, LLP; Mark S. Cohen

(57) ABSTRACT

In a rotating electric machine using permanent magnets and a field control coil, to allow the properties of the rotating electric machine to be readily changed and the rotating electric machine to be adapted to various applications even when it is made of common component parts, the field control coil is adapted to superimpose magnetic flux components of different intensities onto magnetic flux components that are supplied by the magnet poles and iron poles to the teeth, respectively. The magnetic flux components may be differentiated by placing each permanent magnet in a recess defined in an inner circumferential surface of the yoke, and defining each iron pole by a part of the yoke located between an adjacent pair of the permanent magnets in such a manner that the inner circumferential surface of each permanent magnet is lower than the said part of the yoke.

18 Claims, 8 Drawing Sheets

ELECTRIC ROTATING MACHINE PROVIDED WITH A FIELD CONTROL COIL

The present application claims priority from International Application PCT/JP02/03030 filed on Mar. 28, 2002, which in turn claims priority from Japanese Application 2001-092765, filed on Mar. 28, 2001.

TECHNICAL FIELD

The present invention relates to an electric rotating machine using permanent magnets for forming an electric field, and in particular to an electric rotating machine suitable for use as a starter/generator which can be used both as a starter motor for starting an internal combustion engine and as a generator once the engine has started.

BACKGROUND OF THE INVENTION

A vehicle engine is typically provided with a starter motor for starting the engine and a generator for generating electricity once the engine has started, and the accessories of the engine can be made compact and light in weight if these two pieces of equipment are combined into a single unit. Based on such a view point, various proposals have been made to use an electric motor also as a generator. Such a starter/generator is, not exclusively, suitable for use in small motorcycles, and typically consists of an electric rotating machine using permanent magnets for forming a magnetic field.

In such a starter/generator, it is necessary to generate as strong a magnetic field as possible for the given condition (size, weight, etc.) to the end of maximizing the output torque as a starter motor for starting the engine, but a strong magnetic field also results in an excessive generation of electricity when it is used as a generator. Therefore, the applicant previously proposed in Japanese patent laid open publication No. 07-59314 to provide a field control coil and control the strength of the magnetic field passing through the magnet poles. The magnetic field produced by the field control coil partly cancels the magnetic field generated by the permanent magnets, and controls the generation of electricity when it is used as a generator.

However, the permanent magnets and field control coil are arranged in different locations, and a desired control of the magnetic field is not always possible. Thus, it has not been possible to achieve both the maximization of output torque when used as an electric motor and the controlled generation of electricity when used as an electric generator without involving an unacceptable compromise.

BRIEF SUMMARY OF THE INVENTION

In view of such problems of the prior art, a primary object of the present invention is to provide a rotating electric machine of a type using permanent magnets for generating a magnetic field which is adapted to be readily modified of the properties thereof, and can be thereby adapted to different applications without substantially replacing component parts thereof.

A second object of the present invention is to provide an improved rotating electric machine of the above mentioned type provided with a field control coil which can be modified of the properties thereof over a wider range.

A third object of the present invention is to provide an improved rotating electric machine which is suitable for use as a generator that can change the maximum capacity thereof in a favorable manner.

A fourth object of the present invention is to provide an improved rotating electric machine which is suitable for use as a starter/generator for an internal combustion engine.

According to the present invention, such objects can be accomplished by providing a rotating electric machine, comprising a stator including a plurality of teeth each having a coil wound thereon, a rotor including permanent magnet poles and iron poles arranged concentrically and in an alternating fashion, and a field control coil for generating magnetic flux that is superimposed on a magnetic field which the magnet poles and iron poles supply to the teeth, characterized by that: the field control coil is adapted to superimpose magnetic flux components of different intensities onto magnetic flux components that are supplied by the magnet poles and iron poles to the teeth, respectively.

Thus, the control range possible for the field control coil can be expanded for the given supply current by taking advantage of the saturation of magnetic flux. Therefore, an electric rotating machine highly suitable for a starter/generator for an internal combustion engine can be provided. Magnetic flux components of different intensities can be overlaid to the magnetic field components which the magnet poles and iron poles supply to the teeth by using any one of a number of possible means. For instance, by appropriately providing magnetic resistances within the magnetic circuit, the intensities of magnetic flux components can be differentiated. A magnetic resistance can be changed by selecting the material that is interposed in the magnetic circuit, by changing the air gap, or changing the size of the magnetic path such as the thickness and/or width of the part of the yoke defining the magnetic path.

In particular, in the case of a starter/generator for an internal combustion engine, by making the air gap corresponding to the magnet poles greater than that corresponding to the iron poles, the output torque as a starter motor can be maximized while the output as a generator can be effectively controlled. According to such a preferred embodiment, each permanent magnet is placed in a recess defined in an inner circumferential surface of the yoke, and each iron pole is defined by a part of the yoke located between an adjacent pair of the permanent magnets, an inner circumferential surface of each permanent magnet being provided with a height different from that of the said part of the yoke (for instance with a height lower than that of the said part of the yoke) whereby the magnetic flux components of different intensities are superimposed onto magnetic flux components that are supplied by the magnet poles and iron poles to the teeth, respectively.

The electric rotating machine of the present invention can be applied to both outer rotor electric rotating machines and inner rotor electric rotating machines, and may be applied to normal electric motors, generators and engine starters as well as starter/generators.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
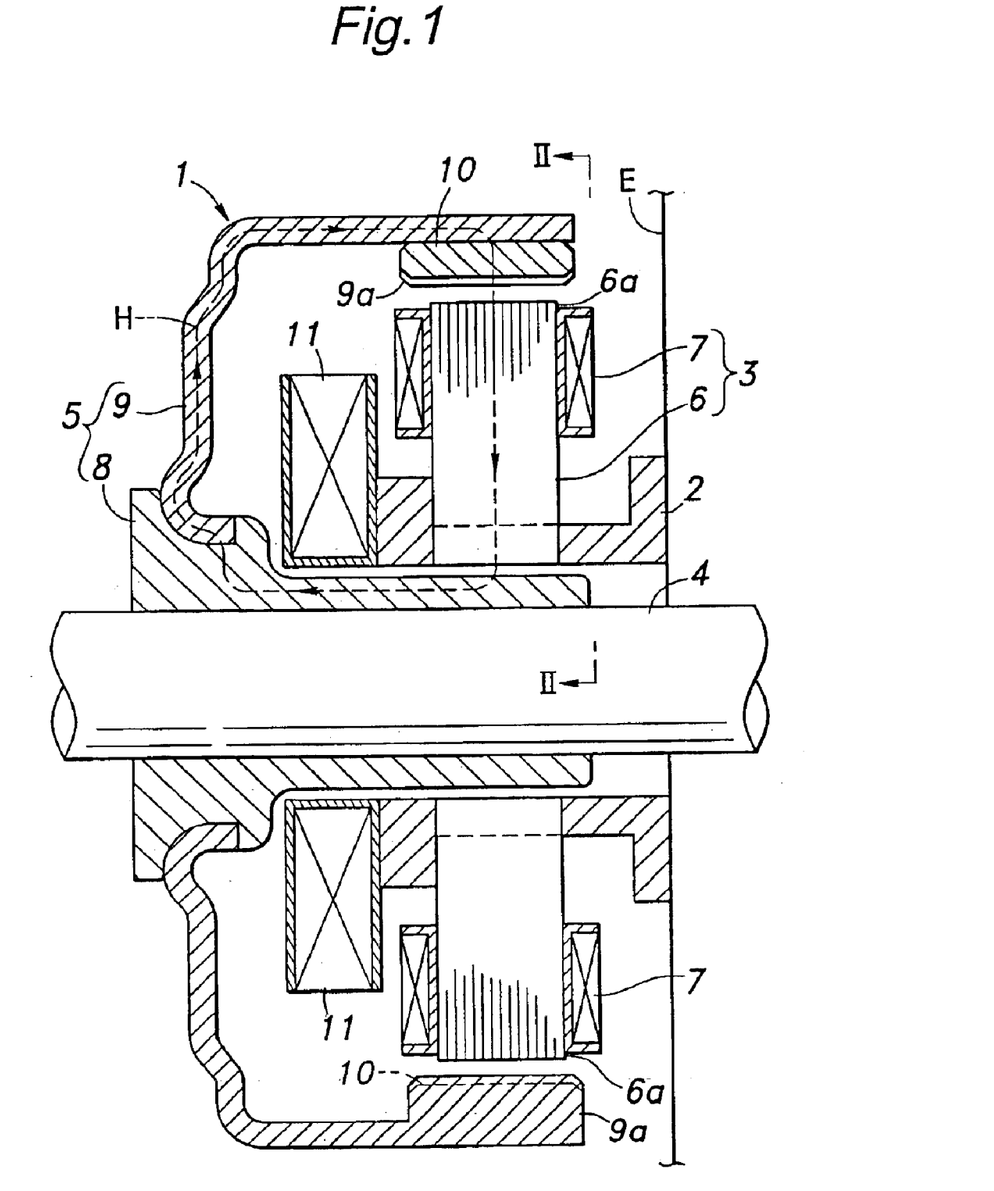
FIG. 1 is a sectional vertical view showing a starter/generator (first embodiment) embodying the present invention.

FIG. 1 is a sectional side view of a starter/generator 1 embodying the present invention. This starter/generator 1 consists of an outer rotor rotating electric machine, and, for instance, comprises a stator 3 fixedly attached to an end wall of an internal combustion engine E for a small motorcycle via a bracket 2, and a rotor 5 fixedly attached to a crankshaft 4 of the engine E. The starter/generator 1 is used as an engine starter when starting the engine, and also as a generator for supplying electricity to a battery not shown in the drawing and other loads once the engine has started.

The stator 3 is provided with a core 6 which is fixedly attached to the bracket 2, and the core 6 is in turn provided with a prescribed number of core teeth 6a which project radially outwardly therefrom. A stator coil 7 is wound around each core tooth 6a. The rotor 5 comprises a boss member 8 fixedly and coaxially attached to the crankshaft 4, and a cup-shaped yoke 9 coaxially attached to the axially projecting end (left end in the drawing) of the boss member 8. A prescribed number of permanent magnets 10 are attached to the inner circumferential surface of the yoke 9 circumferentially at an equal interval.

In this starter/generator 1, a field control coil 11 surrounding the boss member 8 is fixedly attached to the bracket 2, and the field control coil 11 and stator 3 are received inside the yoke 9. By supplying electric current to the field control coil 11, a magnetic flux passing through the boss member 8, core 6 (core tooth 6a) and yoke 9 is generated.

This starter/generator 1 is adapted to operate as a brush-less motor, and a sensor permanent magnet not shown in the drawing is provided on the boss member 8 while a Hall device not shown in the drawing is provided on the corresponding part of the bracket 2 so that a per se known control of a brush-less motor may be effected.

Figure 2:
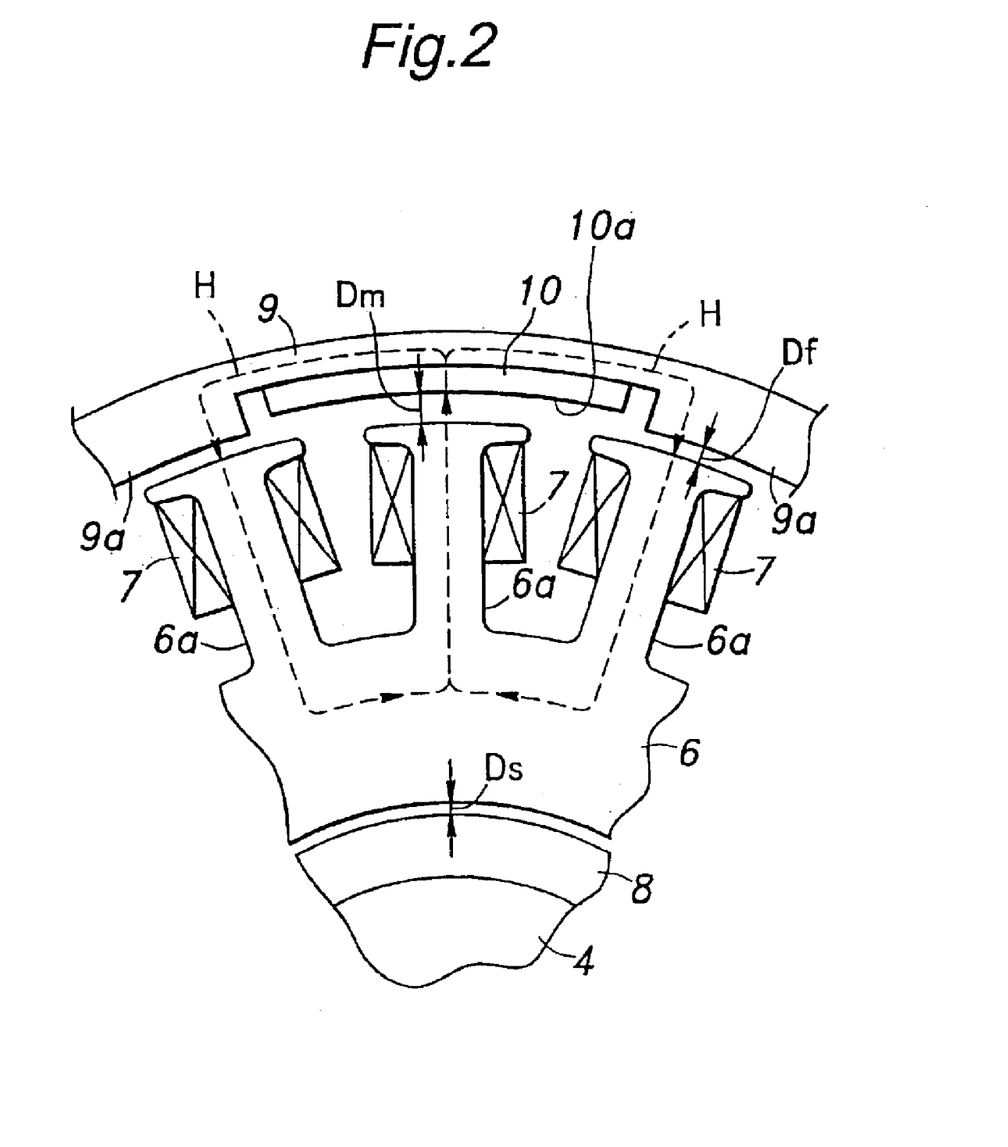
FIG. 2 is a fragmentary sectional view taken along line II—II of FIG. 1.

In this starter/generator 1, as shown in FIG. 2, the permanent magnets 10 are arranged on the inner circumferential surface of the yoke 9 in a spaced apart relationship with a same pole facing radially inward. Magnet poles 10a defined by the inner surfaces of the permanent magnets 10 and iron poles 9a serving as control magnet poles and defined by the parts of the yoke 9 located between adjacent permanent magnets 10 oppose the stator 3 in an alternating manner. Each iron pole 9a may be formed either by a part of the yoke 9 projecting radially inwardly or by a separate member which is fixedly attached to the yoke 9.

Figure 3:
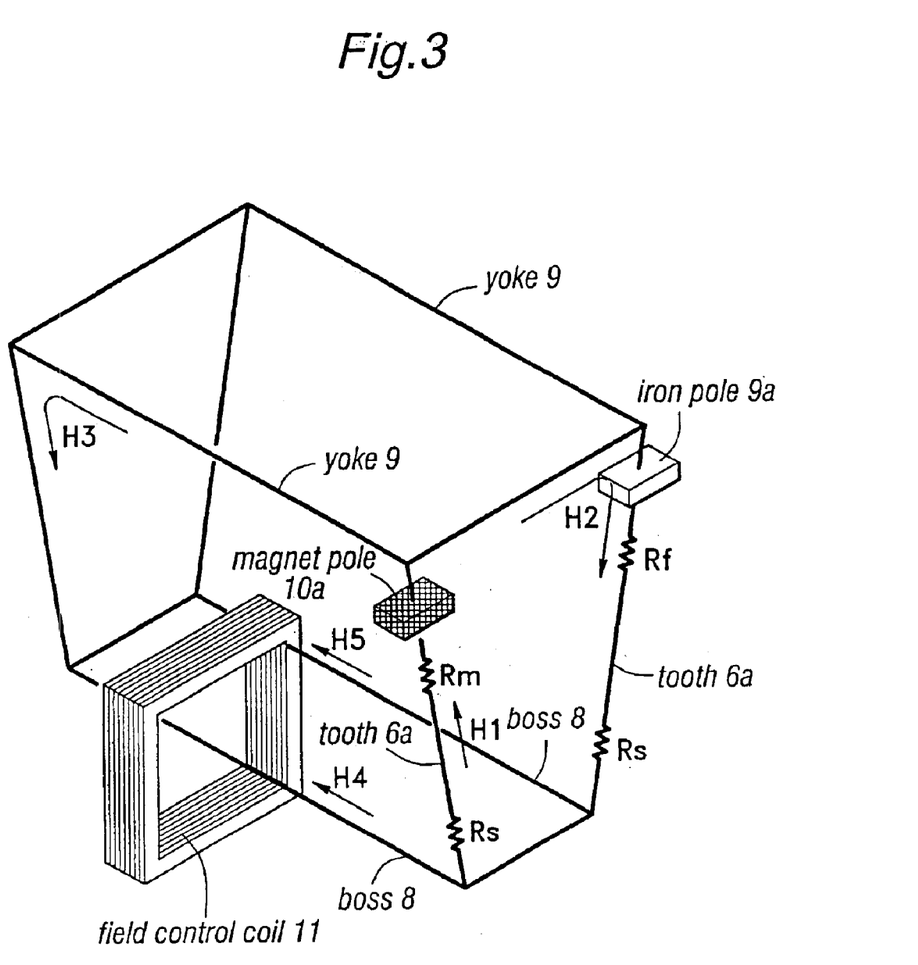
FIG. 3 is a diagram of a magnetic circuit including a permanent magnet and a field control coil serving as sources of magnetic flux.

Thus, the magnetic flux generated by the permanent magnet 10 flows from the tooth 6a to the magnet pole 10a as indicated by arrow $H_1$ in FIG. 3, and forms, on the one hand, a closed loop via the yoke 9, iron pole 9a, tooth 6a, core 6, tooth 6a and magnet pole 10a as indicated by arrow $H_2$ and, on the other hand, a closed loop via the yoke 9, boss member 8, core 6, tooth 6a and magnet pole 10a as indicated by arrow $H_3$. By supplying electric current to the field control coil 11, a magnetic flux passing the boss member 8, yoke 9 and core 6 (tooth 6a) is generated, and this magnetic flux comprises magnetic flux components $H_4$ and $H_5$ passing through the magnet pole 10a and iron pole 9a, respectively. As will be discussed hereinafter, by supplying electric current to the field control coil 11 and producing the magnetic flux components that are superimposed on the magnetic flux components generated by the permanent magnets 10, the magnetic field can be controlled as desired.

Figure 4:
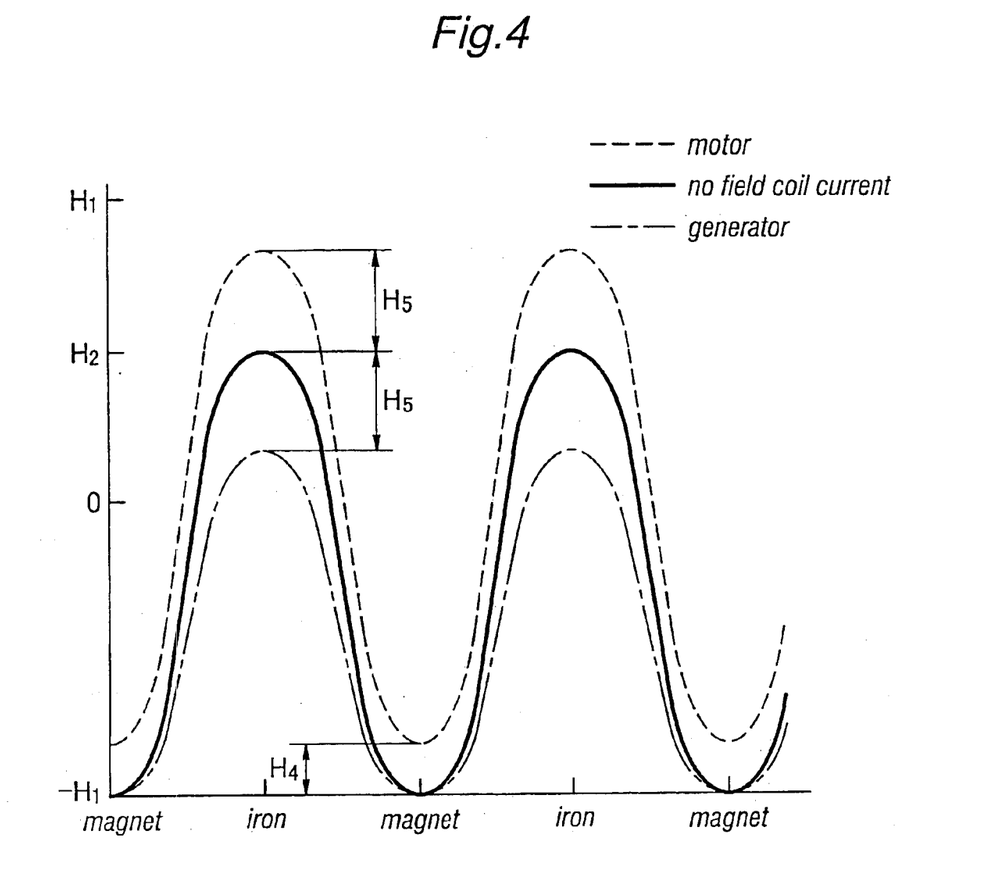
FIG. 4 is a graph showing the distribution of effective magnetic flux between iron poles and magnet poles.

This embodiment is described in more detail with reference to FIGS. 3 and 4. When no electric current is supplied to the field control coil 11, the magnetic flux component $H_1$ flows from the tooth 6a to the magnet pole 10a, and the magnetic flux component $H_2$ flows from the iron pole 9a to the tooth 6a. Therefore, the total swing of the magnetic flux of the magnetic field is given by ($H_1+H_2$). When electric current of a prescribed polarity is supplied to the field control coil 11 to use the rotating electric machine as an engine starter or an electric motor, a magnetic flux component ($H_1-H_4$) flows from the tooth 6a to the magnet pole 10a, and a magnetic flux component ($H_2+H_5$) flows from the iron pole 9a to the tooth 6a. Therefore, the total swing of the magnetic flux of the magnetic field is given by ($H_1+H_2-H_4+H_5$). When electric current of the opposite polarity (electric current of the same amplitude and opposite polarity was selected to simplify the discussion) is supplied to the field control coil 11 to use the rotating electric machine as a generator, a magnetic flux component ($H_1+H_4$) flows from the tooth 6a to the magnet pole 10a and a magnetic flux component ($H_2-H_5$) flows from the iron pole 9a to the tooth 6a. However, from a practical design consideration, the size of the core is minimized for the required magnetic flux so that it is typical for the magnetic circuit including the core to saturate at the magnetic flux level of $H_1$. Therefore, in reality, the magnetic flux component that flows from the tooth 6a to the magnet pole 10a is $H_1$ instead of ($H_1+H_4$). Therefore, the total swing of the magnetic flux of the magnetic field is given by ($H_1+H_2-H_5$).

|  | swing of the magnetic flux of the field |
|---|---|
| motor | $H_1 + H_2 - H_4 + H_5$ |
| no electric current for the field coil | $H_1 + H_2$ |
| generator | $H_1 + H_2 - H_5$ |

Therefore, the difference in the swing of the magnetic flux of the field obtained by reversing the polarity of the field coil is given by ($-H_4+2H_5$). Here, the electric current had a same amplitude, and only its polarity was reversed when selecting the use of the rotating electric machine either as a starter motor or a generator in the foregoing example, but the amplitude and polarity of the electric current can be selected individually and freely in practice.

In this embodiment, as shown in FIG. 2, the permanent magnet 10 is provided in a recessed part of the inner circumferential surface of the yoke 9 opposing the tooth 6a, and the gap Dm defined between the tooth 6a and the inner circumferential surface of the permanent magnet 10 is greater than the gap Df defined between the tooth 6a and the iron pole 9a. Therefore, the magnetic resistance Rm between the permanent magnet 10 and tooth 6a is greater than the magnetic resistance Rf between the iron pole 9a and tooth 6a. On the other hand, the gap Ds defined between the core 6 and the boss member 8 is common for the magnet pole 10a and iron pole 9a, and therefore gives rise to a same magnetic resistance Rs for these two poles 9a and 10a. In particular, because of the difference provided between the magnetic resistances Rm and Rf as mentioned above, $H_5$ is substantially greater than $H_4$. This causes the difference in the swing of the magnetic flux to be made greater accordingly.

Thus, by supplying electric current having a prescribed polarity and amplitude to the field control coil 11, the swing of the magnetic flux of the field can be maximized so as to ensure an adequate output as an electric motor, and by supplying electric current of the opposite polarity to the magnetic field control coil 11, the swing of the magnetic flux of the field can be minimized so as to control the output as a generator. Therefore, when this rotating electric machine is used as a starter/generator, it is possible to obtain an adequate output as a starter and a properly controlled output as a generator by appropriately selecting the polarity and amplitude of the electric current that is supplied to the field control coil 11.

When the rotating electric machine is designed as an electric motor, its property can be varied over a wide range by appropriately selecting the polarity and amplitude of the electric current that is supplied to the field control coil 11. Therefore, a compact and economical electric motor having a large torque output can be achieved without unduly increasing the size of the permanent magnets. In particular, by changing the supply of electric current to the field control coil 11, the electric rotating machine can be adapted to a wide range of applications. Likewise, when the rotating electric machine is designed as a generator, because the property can be controlled over a wide range, the dependency on a regulator circuit can be minimized or the need for a regulator circuit can be even totally eliminated. In particular, when it is used as a generator for an internal combustion engine, the noise and fuel economy properties of the engine can be improved. Furthermore, the rotating electric machine can be readily adapted to the change in the required specifications without changing the basic design. Also, when it is used as a starter motor of an internal combustion engine, the same starter motor can be readily adapted to engines of different specifications.

Figure 5:
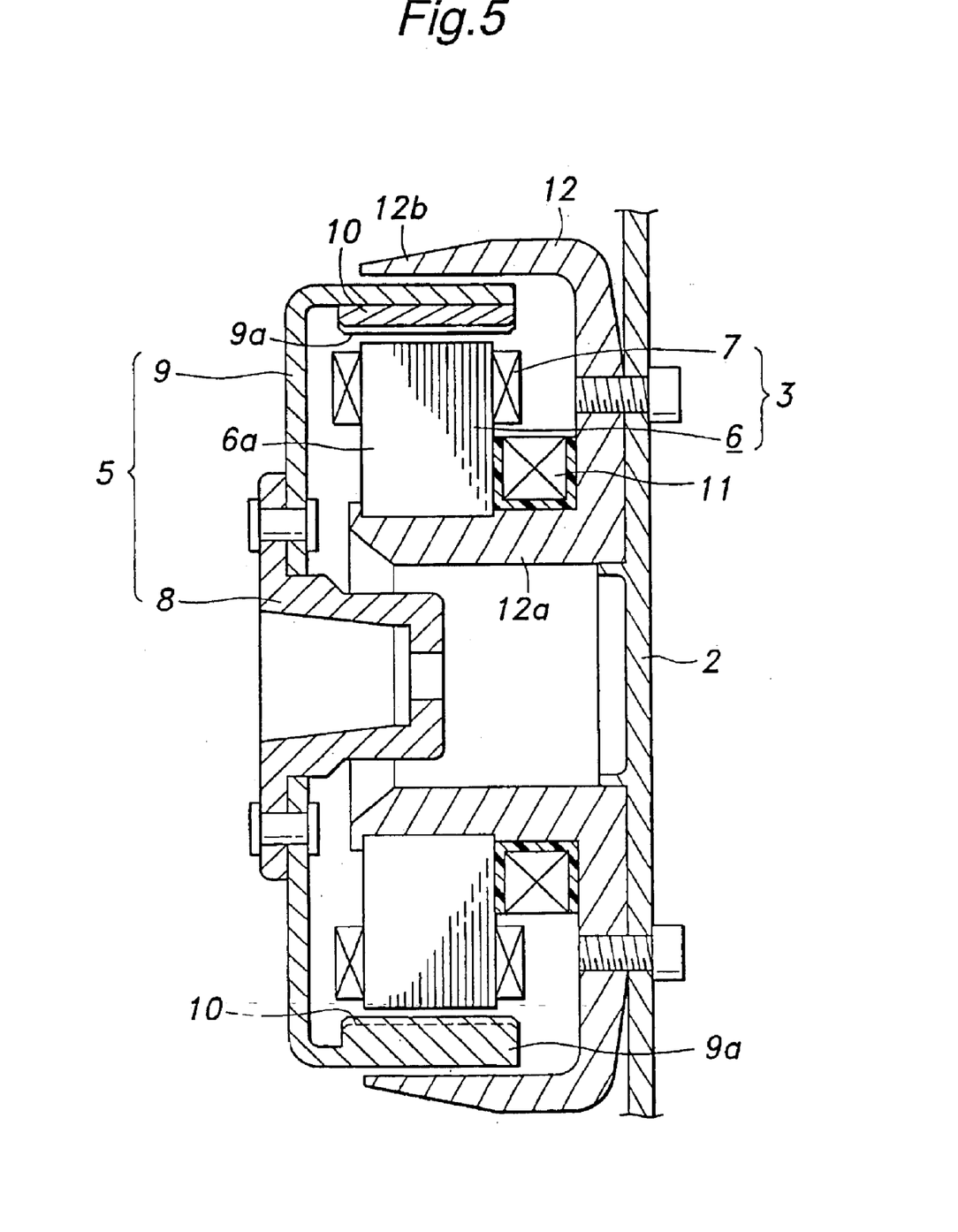
FIG. 5 is a sectional vertical view showing another rotating electric machine (second embodiment) embodying the present invention.

FIG. 5 shows a second embodiment of the present invention which is applied to a generator using a slightly different yoke. In FIG. 5, the parts corresponding to those of the previous embodiment are denoted with like numerals without repeating the description of such parts. This generator is provided with a second yoke 12 fixedly attached to the end bracket 2 of the engine or the like, in addition to a first yoke 11 similar to that of the previous embodiment which is provided on the side of the rotor 5. The second yoke 12 which is disposed coaxially in relation to the rotor 5 is provided with the shape of a cylinder having a closed bottom, and a boss member 12a extends centrally and integrally from the second yoke 12. The boss member 12a extends along the rotational center line of the rotor 5, and is connected to the central inner circumference of the stator core 6 so that the boss member 12a and the stator core 6 are magnetically connected to each other.

The inner bore of the fixed boss member 12a receives a free end of the boss member 8 of the rotor 5, and a gap is defined between the inner circumferential surface of the fixed boss member 12a and the outer circumferential surface of the boss member 8 of the rotor 5 to magnetically insulate these two parts from each other. An additional gap is defined between the free end of the fixed boss member 12a and the bottom of the first yoke 9 to magnetically insulate them from each other. Thereby, the magnetic flux from the field control coil 11 is prevented from flowing into the boss member 8 of the rotor 5 and the bottom part of the first yoke 9. The bottom part of the second yoke 12 is fixedly attached to the end bracket 2 by threaded bolts.

The second yoke 12 is provided with an outer cylindrical part 12b which surrounds the outer cylindrical part of the first yoke 9 from the opposite side of the first yoke 9 or from the right hand side of the drawing. An air gap is defined between the outer circumferential surface of the outer cylindrical part of the first yoke 9 and the outer cylindrical part 12b of the second yoke 12 so that the cylindrical part of the first yoke 9 along with the magnet poles 10a and iron poles 9a is received between the cylindrical part 12b of the second yoke 12 and the stator core 6. In other words, with the boss member 8 of the rotor 5 received centrally in the fixed boss member 12a of the second yoke 12, the rotor 5 is driven by a crankshaft or the like whereby the magnet poles 10a and iron poles 9a rotate around the stator.

A field control coil 11 is disposed on a side of the stator core 6 facing away from the first yoke 9, interposed between the stator core 6 and the bottom part 12a of the second yoke 12. The field control coil 11 is wound around the fixed boss member 12a, and the intensity and polarity of electric current that is supplied to the field control coil 11 can be appropriately controlled by a control circuit not shown in the drawing. According to this generator, as opposed to the embodiment illustrated in FIGS. 1 and 2, wiring is not required to pass through the stator core 6 to reach the field control coil 11, and the wiring structure can be thereby simplified as compared to the prior art.

According to the generator of this embodiment, the magnetic flux generated by the field control coil 11 flows from the cylindrical part 12b of the second yoke 12 to the cylindrical part of the first yoke 9 via an air gap while the boss member 8 of the rotor 5 is magnetically insulated from the boss member 12a of the second yoke 12 via a gap so that the magnetic flux generated by the field control coil 11 does not pass through the bottom part of the first yoke 9. In other words, the magnetic circuit (for which the field control coil 11 serves as a magnetic source) which was conventionally formed by the first yoke 9 is formed by the second yoke 12 in this case. Therefore, the bottom part of the first yoke 9 and the boss member 8 of the rotor 5 are relieved from such a role, and the thickness of the first yoke 9 and the dimensions of the boss member 8 of the rotor 5 can be reduced so that the weight and inertia mass of the rotor 5 can be made comparable to those of the conventional motor not based on the hybrid field system.

Therefore, the hybrid field system can be applied to generators which have been considered as unsuitable because of the limitations associated with the inertia mass, and even such generators can be adapted to the property control thereof using a field control coil 11 and iron poles 6a. Furthermore, because the first yoke 9 and the boss member 8 of the rotor 5 can be reduced in size, and the overall profile of the product can be minimized.

Additionally, because the first yoke 9 and the boss member 8 of the rotor 5 are not used as the magnetic path for the field control coil 11, these components may consist of those for more conventional generators not based on the hybrid field system. In other words, the conventional rotating electric machine can be used simply by arranging a combination of permanent magnets and iron poles, instead of arranging permanent magnets entirely along the inner circumference of the first yoke 9. Therefore, the first yoke 9 and the boss member 8 of the rotor are not required to be specially designed so as to make them match the field control coil 11, and the production cost can be minimized because the existing component parts and production facilities can be used without any modifications.

In this embodiment also, the permanent magnet 10 is provided in a recessed part of the inner circumferential surface of the yoke 9 opposing the tooth 6*a*, and the gap Dm defined between the tooth 6*a* and the inner circumferential surface (magnet pole 10*a*) of the permanent magnet 10 is greater than the gap Df defined between the tooth 6*a* and the iron pole 9*a*. Therefore, the magnetic resistance Rm between the permanent magnet 10 and tooth 6*a* is greater than the magnetic resistance Rf between the iron pole 9*a* and tooth 6*a*. Therefore, this generator provides advantages similar to those that are achieved by the forgoing embodiment.

Figure 6:
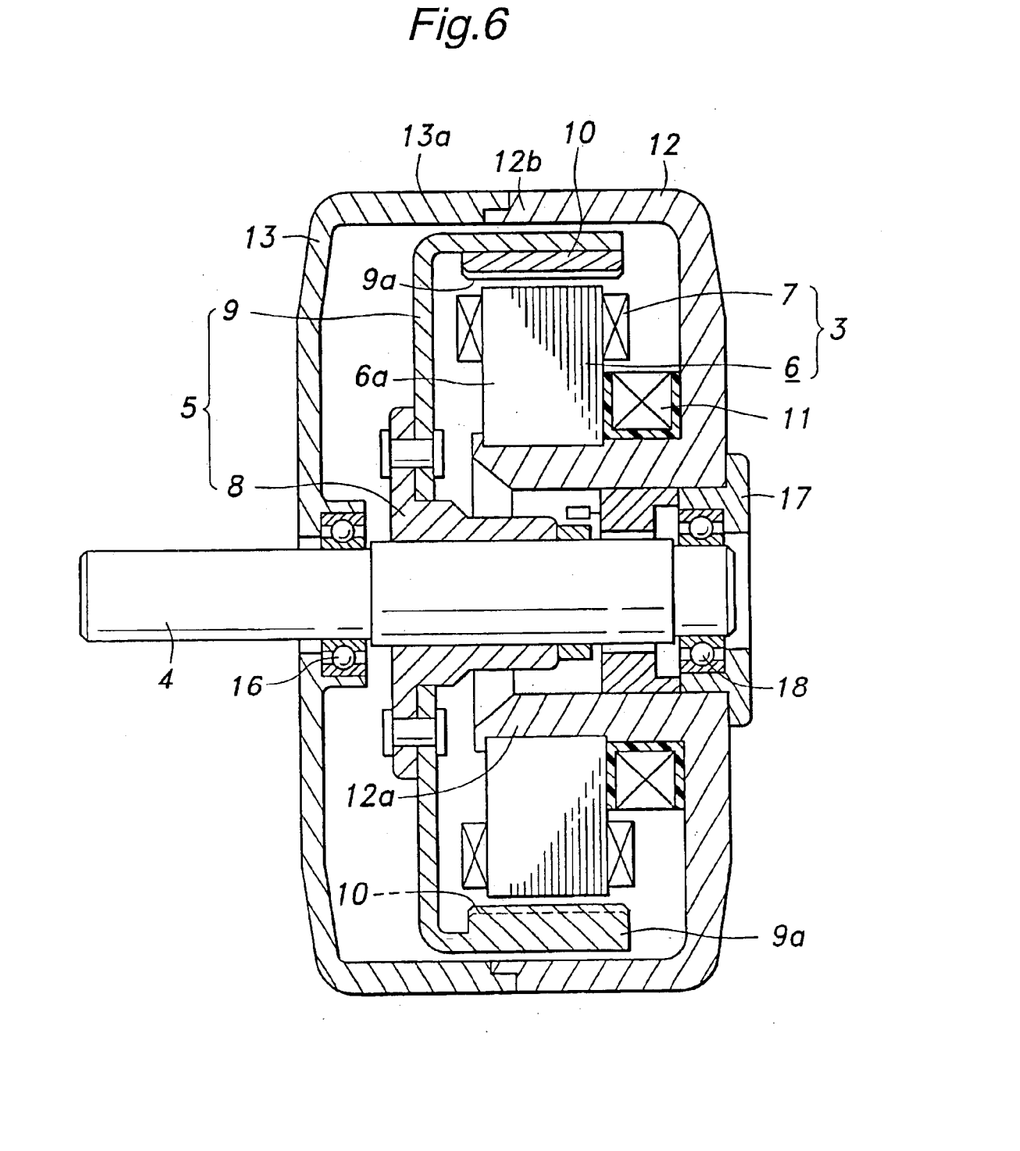
FIG. 6 is a sectional vertical view showing yet another rotating electric machine (third embodiment) embodying the present invention.

FIG. 6 shows a third embodiment of the present invention which is applied to a brush-less motor. In FIG. 6, the parts corresponding to those of the previous embodiment are denoted with like numerals without repeating the description of such parts. This brush-less motor is provided with a similar structure as the generator of the second embodiment illustrated in FIG. 5, but the second yoke 12 serves as the casing of the motor in addition to as the end bracket.

According to this motor, the rotor 5 is fixedly attached to a motor shaft 4, and is rotatably accommodated in a front bracket 13 made of non-magnetic material such as aluminum and an end bracket 12 serving also as a second yoke. The front bracket 13 and end bracket 12 are attached to each other by fastening means not shown in the drawing with cylindrical parts 12*a* and 13*a* extending from these two parts abutting each other. The front bracket 13 is provided with a bearing 16, and the end bracket 12 is provided with a bearing 18 which is retained by a bearing holder 17 made of non-magnetic material. The motor shaft 4 is rotatably supported by these bearings 16 and 18. This motor also allows the component parts of the conventional electric motor such as the rotor 5 and the front bracket 13, and the existing production facilities to be used without any modification. The electric motor is thus assembled as a single integral unit.

In this embodiment also, the permanent magnet 10 is provided in a recessed part of the inner circumferential surface of the yoke 9 opposing the tooth 6*a*, and the gap Dm defined between the tooth 6*a* and the inner circumferential surface (magnet pole 10*a*) of the permanent magnet 10 is greater than the gap Df defined between the tooth 6*a* and the iron pole 9*a*. Therefore, the magnetic resistance Rm between the permanent magnet 10 and tooth 6*a* is greater than the magnetic resistance Rf between the iron pole 9*a* and tooth 6*a*. Therefore, this generator provides advantages similar to those that are achieved by the forgoing embodiments. Although this electric motor is based on the hybrid field system, the weight an inertia mass can be controlled to the levels of the conventional electric motor, and an electric motor whose properties can be controlled at will can be used much in the same way as a more conventional electric motor. It should be appreciated that this structure is also applicable to electric generators.

Figure 7:
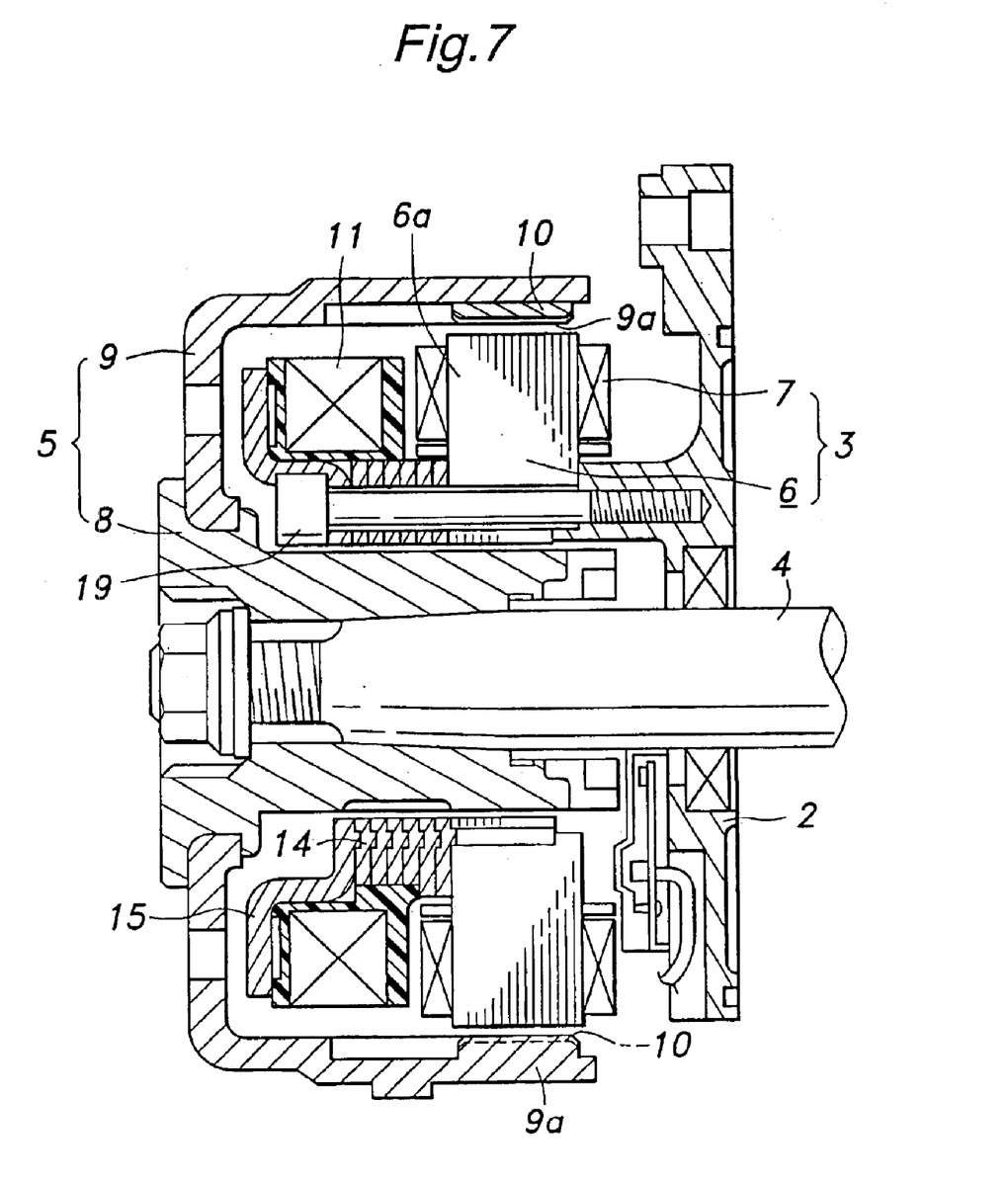
FIG. 7 is a sectional vertical view showing yet another rotating electric machine (fourth embodiment) embodying the present invention.

FIG. 7 shows a fourth embodiment of the present invention which is applied to a generator using a slightly different yoke. In FIG. 7, the parts corresponding to those of the previous embodiments are denoted with like numerals without repeating the description of such parts. As shown in FIG. 7, this generator consists of a stator 5 and a rotor 3. In this case, the rotor 5 serves as a field element, and the stator 3 serves as an armature. This generator is based on the hybrid field system, and comprises a field control coil 11, and iron poles 6*a* serving as control magnet poles similarly as the foregoing embodiments.

The rotor 5 comprises a boss member 8 which receives the crankshaft 4 of an engine, for instance, in a fixed manner, and a first yoke 9 fixedly attached to the outer surface of the boss member 8 of the rotor. The boss member 8 of the rotor 5 is made of magnetic material such as iron, and is provided with a cylindrical shape. The boss member 8 of the rotor receives the crankshaft 4 in a rotationally fast manner. The left end of the boss member 8 of the rotor is provided with a radial flange part which is provided with an annular connecting groove for fixedly attaching the first yoke 9 thereto.

The first yoke 9 is made of magnetic material such as iron, and is provided with the shape of a short cylinder having a closed end. The first yoke 9 and the boss member 8 of the rotor are disposed in a mutually coaxial relationship. The central opening of the bottom part of the first yoke 9 is fitted into the connecting groove, but other possible means may also be used for joining the first yoke 9 to the boss member 8 of the rotor. The inner circumferential surface of the outer cylindrical part of the first yoke 9 is provided with permanent magnets 10 (magnet poles 10*a*) and iron poles 9*a* serving as control magnet poles and formed by the material of the first yoke 9 along the circumferential direction in an alternating fashion. The magnet poles 10*a* and iron poles 9*a* jointly form the field element of the rotor 5. In short, this embodiment is also based on the hybrid field system, and the field element is connected to a control unit. Additionally, similarly as the embodiment illustrated in FIG. 2, the permanent magnet 10 is provided in a recessed part of the inner circumferential surface of the yoke 9 opposing the tooth 6*a*, and the gap Dm defined between the tooth 6*a* and the inner circumferential surface (magnet pole 10*a*) of the permanent magnet 10 is greater than the gap Df defined between the tooth 6*a* and the iron pole 9*a*. Therefore, the magnetic resistance Rm between the permanent magnet 10 and tooth 6*a* is greater than the magnetic resistance Rf between the iron pole 9*a* and tooth 6*a*. Therefore, this generator provides advantages similar to those that are achieved by the forgoing embodiments.

The stator 3 comprises a stator core (core member) 6, a stator coil 7 wound around each core tooth 6*a*, and a second yoke 14 which is placed on the left end of the stator core 6 as seen in the drawing and magnetically connected to the stator core 6. The stator core 6 is formed by laminating a number of thin plates of magnetic material such as iron. The stator core 6 is centrally provided with an opening for magnetically coupling with the boss member 8 of the rotor via an air gap. The stator core 6 is attached to the bracket 2 by at least three threaded bolts.

The second yoke 14 is also formed by laminating a number of thin plates of magnetic material such as iron, and comprises a main body having a small diameter and opposing the boss member 8 via an air gap, and a disk part 15 which extends from the upper most plate (the plate on the left end) having an L-shaped cross section. A field control coil 11 is wound around a shoulder part defined by the main body and disk part 15 of the second yoke 14 so as to surround the second yoke 14. Therefore, by supplying electric current to this coil, the coil produces magnetic flux components which are superimposed on the magnetic field produced by the permanent magnets 10.

One side of the disk part 15 extends in parallel with the inner surface of the bottom part of the first yoke 9, and a planar gap is defined between the side of the disk part 15 and the inner surface of the bottom part of the first yoke 9. The spacing of this gap can be selected at will. By thus appropriately arranging the side of the disk part 15 and inner surface of the bottom part of the first yoke 9, the flow of magnetic flux from the disk part 15 of the second yoke 14 to the bottom part of the first yoke 9 can be effected in a uniform manner over the entire parts thereof.

In this embodiment also, the permanent magnet 10 is provided in a recessed part of the inner circumferential surface of the yoke 9 opposing the tooth 6a, and the gap Dm defined between the tooth 6a and the inner circumferential surface (magnet pole 10a) of the permanent magnet 10 is greater than the gap Df defined between the tooth 6a and the iron pole 9a. Therefore, the magnetic resistance Rm between the permanent magnet 10 and tooth 6a is greater than the magnetic resistance Rf between the iron pole 9a and tooth 6a. Therefore, this generator provides advantages similar to those that are achieved by the forgoing embodiment. Therefore, this generator provides similar advantages as the foregoing embodiments.

Figure 8:
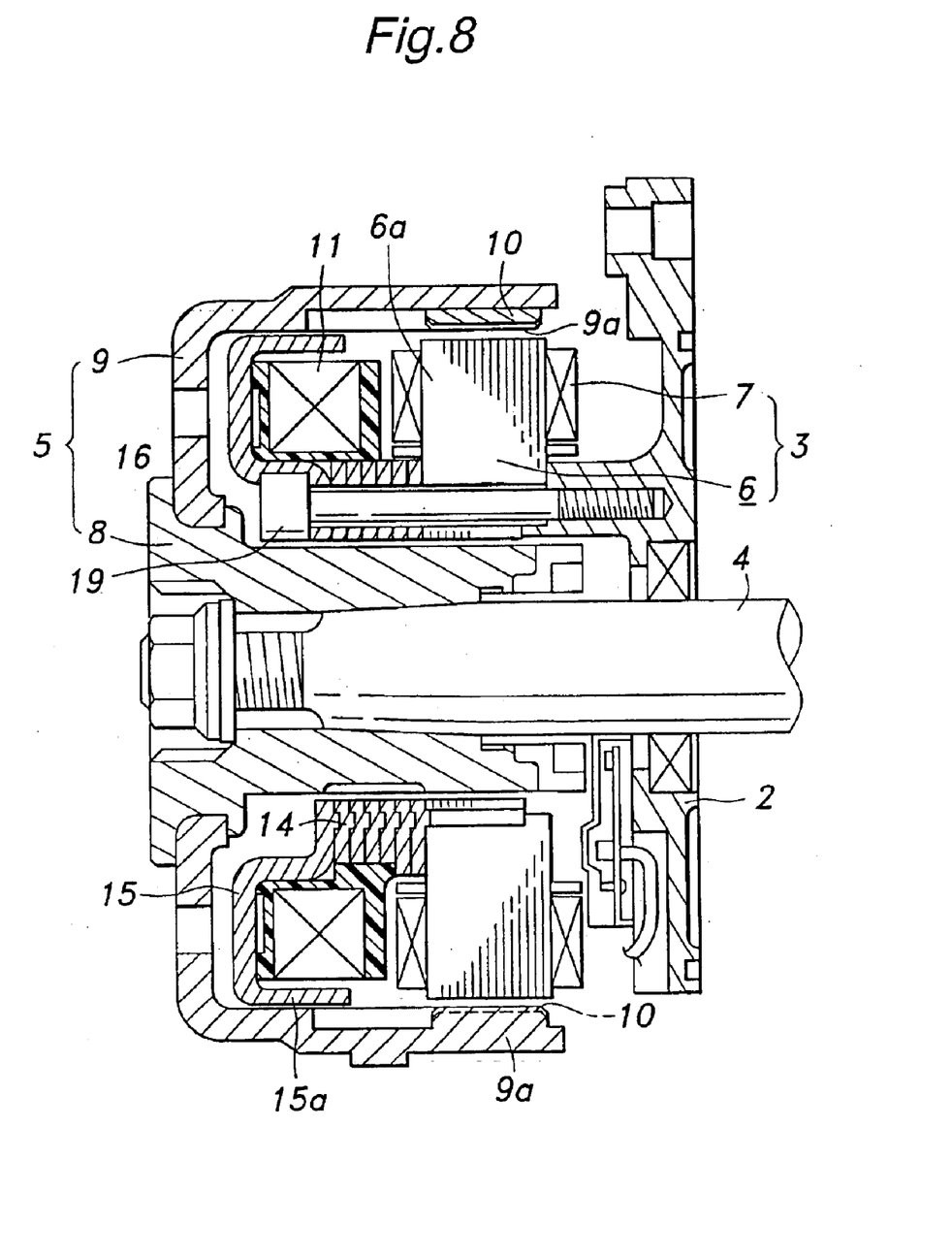
FIG. 8 is a sectional vertical view showing yet another rotating electric machine (fifth embodiment) embodying the present invention.

FIG. 8 shows a fourth embodiment of the present invention which is applied to a generator using a slightly different yoke. In FIG. 8, the parts corresponding to those of the previous embodiments are denoted with like numerals without repeating the description of such parts. As shown in FIG. 8, this generator is provided with a second yoke 14 similar to that of the previous embodiment, and an extension 15a is additionally provided along the outer periphery (free end) of the disk part 15. One side of the extension 15a extends substantially in parallel with the inner surface of the cylindrical part of the first yoke 9. A suitable gap is defined between the side of the extension 15a and the inner surface of the cylindrical part of the first yoke 9. As can be readily appreciated, the extension 15a contributes to the flow of the magnetic flux component from the second yoke 14 to the cylindrical part of the first yoke 9, and thereby allows the weight of the boss member 8 and the first yoke 9 of the rotor 5 to be minimized without reducing the effective magnetic flux.

INDUSTRIAL APPLICABILITY

Although the present invention has been described in terms of applications to electric generators and brush-less motors, the present invention can be applied to a wider range of rotating electric machines using permanent magnets provided on the side of the rotor, such as starter/generators for motorcycles, portable generators, various utility devices using general purpose engines such as battery-less spraying machines, outer rotor fan motors, and so forth. In fact, the foregoing embodiments are applicable to all forms of rotating electric machines, and they may include both outer rotor and inner rotor rotating electric machines. Also, the kinds of rotating electric machines of the present invention include, not exclusively, electric motors, generators, starter motors and starter/generators which serve the dual purposes of a starter motor and a generator.

What is claimed is:

1. A rotating electric machine, comprising: a stator including at least a plurality of teeth each having at least a coil wound thereon, a rotor including at least permanent magnet poles and iron poles arranged concentrically and in an alternating fashion, and a field control coil for generating magnetic flux that is superimposed on a magnetic field, which the magnet poles and iron poles supply to the teeth, wherein, the field control coil is adapted to superimpose magnetic flux components of different intensities, onto magnetic flux components that are supplied by said magnet poles and iron poles to the teeth, respectively, by differentiating magnetic resistances for magnetic paths that are formed by said field control coil, through providing different air gaps in the corresponding magnetic paths, so as to pass through said magnetic poles and said iron poles.

2. A rotating electric machine according to claim 1, wherein the air gap for the magnet poles is greater than the air gap for the iron poles.

3. A rotating electric machine according to claim 1, wherein the rotating electric machine comprises an outer rotor rotating machine, and the rotor is provided with a central boss, and a yoke having a cylindrical shape with a closed end which is coaxially attached to the central boss, the magnet poles and iron poles being formed on an inner circumferential surface of the yoke.

4. A rotating electric machine according to claim 3, wherein each permanent magnet pole is disposed in a recess defined in an inner circumferential surface of the yoke, and each iron pole is defined by a part of the yoke located between an adjacent pair of the permanent magnet poles, an inner circumferential surface of each permanent magnet pole being provided with a height different than that of the said part of the yoke whereby the magnetic flux components of different intensities are superimposed onto magnetic flux components that are supplied by the magnet poles and iron poles to the teeth, respectively.

5. A rotating electric machine according to claim 1, wherein the inner circumferential surface of each permanent magnet is lower than the said part of the yoke.

6. A rotating electric machine according to claim 1, wherein the rotating electric machine includes at least an electric motor.

7. A rotating electric machine according to claim 1, wherein the rotating electric machine includes at least an electric generator.

8. A rotating electric machine according to claim 1, wherein the rotating electric machine includes at least a starter motor.

9. A rotating electric machine according to claim 1, wherein the rotating electric machine includes at least a starter and generator.

10. A rotating electric machine according comprising: a inner stator including a plurality of teeth each having a coil wound thereon, an outer rotor including at least a central boss and a yoke having a cylindrical shape with a closed end which is coaxially attached to the central boss and permanent magnet poles and iron poles arranged concentrically and in alternating fashion on the inner circumference of the surface of said yoke, and a field control coil, for generating magnetic flux that is superimposed on a magnetic field which said permanent magnet poles and said iron poles supply to said teeth; and wherein each said permanent magnet pole is disposed in a recess defined in an inner circumferential surface of the yoke and each said iron pole is defined by a part of the yoke located between an adjacent pair of said permanent magnet poles, an inner circumferential surface of each said permanent magnet pole is provided with a height different than that of the said part of the yoke whereby the magnetic flux components of different intensities are superimposed onto magnetic flux components that are supplied by said permanent magnet poles and said iron poles to said teeth, respectively.

11. A rotating electric machine according to claim 10, wherein the magnetic flux components of different intensities are superimposed onto magnetic flux components that are supplied by the magnetic poles and iron poles to the teeth respectively, by differentiating magnetic resistances for magnetic paths that are formed by said field control coil so as to pass through the magnet poles and iron poles, respectively.

12. A rotating electric machine according to claim 11, wherein the magnetic resistances are differentiated by providing different air gaps in the corresponding magnetic paths.

13. A rotating electric machine according to claim 12, wherein, the air gap for said magnet poles is larger than the air gap for said iron poles.

14. A rotating electric machine according to claim 10, wherein the inner circumferential surface of each permanent magnet pole is lower than the said part of the yoke.

15. A rotating electric machine according to claim 10, wherein the rotating electric machine comprises an electric motor.

16. A rotating electric machine according to claim 10, wherein the rotating electric machine comprises an electric generator.

17. A rotating electric machine according to claim 10, wherein the rotating electric machine comprises a starter motor.

18. A rotating electric machine according to claim 10, wherein the rotating electric machine comprises a starter and or generator.

* * * * *